(12) United States Patent
Sabharwall et al.

(10) Patent No.: US 12,092,501 B2
(45) Date of Patent: Sep. 17, 2024

(54) FLOW METERS AND RELATED SYSTEMS AND METHODS

(71) Applicants: Battelle Energy Alliance, LLC, Idaho Falls, ID (US); University of Idaho, Moscow, ID (US); Paul Marotta, Jersey City, NJ (US)

(72) Inventors: Piyush Sabharwall, Idaho Falls, ID (US); Paul Marotta, Jersey City, NJ (US); Richard Christensen, Idaho Falls, ID (US); Nicholas Williams, Lapeer, MI (US); Jason Palmer, Rigby, ID (US)

(73) Assignees: Paul Marotta, Jersey City, NJ (US); Battelle Energy Alliance, LLC, Idaho Falls, ID (US); University of Idaho, Moscow, ID (US)

( * ) Notice: Subject to any disclaimer, the term of this patent is extended or adjusted under 35 U.S.C. 154(b) by 4 days.

(21) Appl. No.: 17/117,427

(22) Filed: Dec. 10, 2020

(65) Prior Publication Data
US 2021/0223073 A1    Jul. 22, 2021

Related U.S. Application Data

(60) Provisional application No. 62/963,590, filed on Jan. 21, 2020.

(51) Int. Cl.
*G01F 1/32* (2022.01)

(52) U.S. Cl.
CPC .................. *G01F 1/3209* (2013.01)

(58) Field of Classification Search
CPC ........ G01F 1/32; G01F 1/3209; G01F 1/3218; G01F 1/3245
See application file for complete search history.

(56) References Cited

U.S. PATENT DOCUMENTS

| | | | | |
|---|---|---|---|---|
| 3,589,185 A | * | 6/1971 | Burgess | G01F 1/3218 |
| | | | | 73/861.22 |
| 4,297,898 A | * | 11/1981 | Herzl | G01F 1/32 |
| | | | | 73/861.22 |

(Continued)

FOREIGN PATENT DOCUMENTS

| | | |
|---|---|---|
| IN | 201847014504 A | 4/2018 |
| WO | 2018/204723 A1 | 11/2018 |
| WO | 2019/006496 A1 | 1/2019 |

OTHER PUBLICATIONS

Bamberger et al., "Experimental and numerical investigation of edge tones", Zamm Z. Angew . Math. Mech. 84, No. 9, pp. 632-646 (2004).

(Continued)

*Primary Examiner* — Erika J. Villaluna
(74) *Attorney, Agent, or Firm* — TraskBritt

(57) ABSTRACT

Flow meters may include a body defining a fluid channel therein. At least one structure may be positioned within the fluid channel, and fixed relative to the body, that is shaped and positioned to produce a flow-induced vibration that varies according to a rate of fluid flow through the fluid channel. A method of measuring a fluid flow rate may include directing a fluid over a first structure located in a first channel, and producing a first flow-induced vibration that varies according to a rate of fluid flow in a first channel with the first structure. The method may further include measuring the vibration of a remote structure coupled to the first channel, and determining the rate of fluid flow in the first channel from the measured vibration.

19 Claims, 6 Drawing Sheets

(56) References Cited

U.S. PATENT DOCUMENTS

| | | | | |
|---|---|---|---|---|
| 4,322,982 | A * | 4/1982 | Muller | G01F 1/58 73/861.12 |
| 5,291,780 | A * | 3/1994 | Thomas | G01F 1/32 73/195 |
| 7,357,030 | B2 * | 4/2008 | Novascone | G01V 1/46 181/102 |
| 2016/0327419 | A1 | 11/2016 | Hellevang et al. | |
| 2017/0009574 | A1 * | 1/2017 | Murphree | E21B 47/20 |
| 2018/0277267 | A1 * | 9/2018 | Loewen | G01F 1/66 |
| 2019/0011300 | A1 | 1/2019 | Gloss et al. | |
| 2020/0282161 | A1 * | 9/2020 | Chamtie | A61M 16/06 |

OTHER PUBLICATIONS

Brackenridge et al., "Acoustical Characteristic of Oscillation Jet-Edge Systems in Water", The Journal of the Acoustical Society of America, vol. 29, 459 (1957).

Brown et al., "The vortex motion causing edge tones", G. Burniston Brown 1937 Proc. Phys. Soc. 49 493.

Brown, "Organ Piped and Edge Tones", Nature Publishing Group, vol. 141, 11-13.

Coltman, "Jet drive mechanisms in edge tones and organ pipes", J. Accoust. Soc. Am., vol. 60, No. 3, Sep. 1976, pp. 725-733.

Crighton, "The edge-tone feedback cycle. Linear theory for the operating stages", J. Fluid Mech. (1992), vol. 234, pp. 361-391.

Curle, "The mechanics of edge-tones", Department of Mathematics, The University, Manchester, Proc. Roy. Soc. A. 216, pp. 412-424.

Fabre et al., "Vortex Shedding in Steady Oscillation of a Flue Organ Pipe", ACUSTICA, acta acustica, Vo. 82, (1996), pp. 863-877.

Jones, "Edge tones", J. Acoust. Soc. Am., vol. 14, pp. 131-139.

Lin et al., "Oscillations of a Turbulent Jet Incident Upon and Edge", Journal of Fluids and Structures, vol. 15, pp. 791-829.

Paal et al., "Unsteady phenomena in the edge tone", International Journal of Heat and Fluid Flow, vol. 28 (2007), pp. 575-586.

Paal, "Mode Switching and Hysteresis in the Edge Tone", J. Phys. Conf. Ser., vol. 268 (2011) 012031.

Powell, "On the edge tone", J. Acoust. Soc. Am., vol. 33,pp. 395-409.

Vaik et al. "Frequency and Phase Characteristics of the Edge Tone, Part I", Period Polytechnica Mechanical Engineering, vol. (1), pp. 55-67, 2014.

Vaik et al., "Frequency and Phase Characteristics of the Edge Tone, Part II", Periodica Polytechnica Mechanical Engineering, vol. 58(1), pp. 69-76, 2014.

* cited by examiner

FLOW METERS AND RELATED SYSTEMS AND METHODS

CROSS-REFERENCE TO RELATED APPLICATION

This application claims the benefit of U.S. Provisional Patent Application Ser. No. 62/963,590, filed Jan. 21, 2020, and entitled "Advanced Flow Meter for Extreme Environments," the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

Embodiments of the disclosure relate generally to flow meters. More particularly, embodiments of the disclosure relate to flow meters that may be utilized in extreme environments, and related systems and methods.

BACKGROUND

Flow indication is a key component for quantifying performance of any device that involves moving fluids. Some devices that involve moving fluids may involve harsh environments. For example, the molten salt nuclear reactor environment is aggressive chemically, thermally and radiologically. This provides many challenges for flow indication in these environments, as the materials of construction of conventional flow meters may not withstand such environmental conditions. Any part of a sensor, such as a flow meter, in contact with the salt must be capable of surviving and operating in the harsh environment and must also be compatible with other materials such as piping, and insulation. Additionally, electrical and signal cabling supporting the functionality of the sensor must also be protected and/or shielded appropriately. In the case of new advanced molten salt reactors, the optimal location for flow measurement may be imbedded within the reactor equipment, which presents a design challenge for instrument and associated cable routing accessibility.

BRIEF SUMMARY

In accordance with embodiments described herein, flow meters may include a body defining a fluid channel therein. At least one structure may be positioned within the fluid channel, and fixed relative to the body, that is shaped and positioned to produce a flow-induced vibration that varies according to a rate of fluid flow through the fluid channel.

In additional embodiments, a method of measuring a fluid flow rate may include directing a fluid over a first structure located in a first channel, and producing a first flow-induced vibration that varies according to a rate of fluid flow in a first channel with the first structure. The method may further include measuring the vibration of a remote structure coupled to the first channel, and determining the rate of fluid flow in the first channel from the measured vibration.

In further embodiments, a flow metering system may comprise at least one flow meter, which may include a body defining a fluid channel therein. At least one structure may be positioned within the fluid channel, and fixed relative to the body, that is shaped and positioned to produce a flow-induced vibration that varies according to a rate of fluid flow through the fluid channel. A structure may be coupled to the at least one flow meter, and at least one vibration sensor may be coupled to the structure at a location remote from the at least one flow meter. A signal processor may be configured to receive a signal from the at least one vibration sensor and determine at least one flow rate.

DETAILED DESCRIPTION

Figure 1:
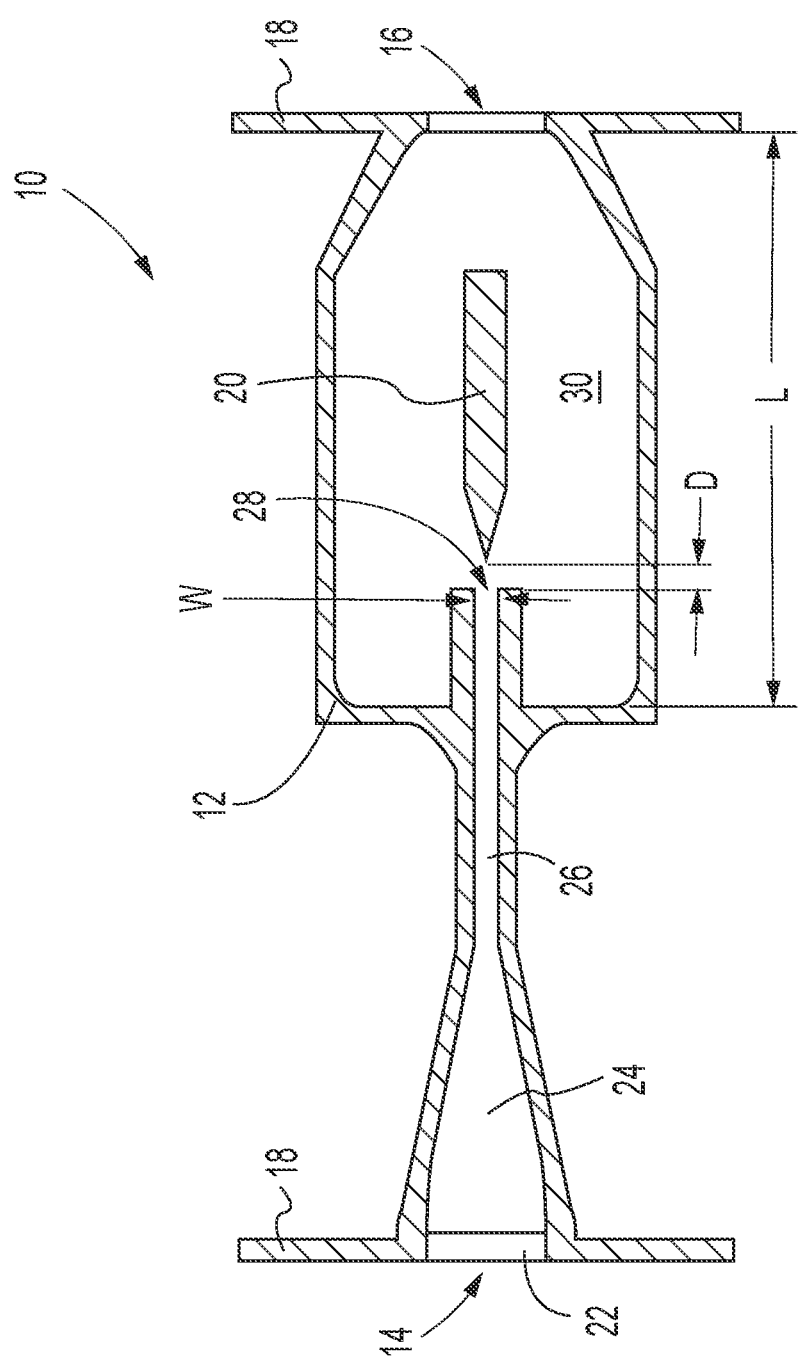
FIG. 1 shows a cross-sectional view of a flow meter comprising an edge tone structure according to an embodiment of the present disclosure.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. Only those process acts and structures necessary to understand the embodiments of the disclosure are described in detail below. Also note, any drawings accompanying the present application are for illustrative purposes only, and are thus not drawn to scale. Additionally, elements common between figures may retain the same numerical designation.

As used herein, the terms "comprising," "including," "having," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature, or method act indicates that such is contemplated for use in implementation of an embodiment of the disclosure and such term is used in preference to the more restrictive term "is" so as to avoid any implication that other, compatible materials, structures, features, and methods usable in combination therewith should or must be excluded.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "configured" refers to a size, shape, material composition, orientation, and arrangement of one or more of at least one structure and at least one apparatus facilitating operation of one or more of the structure and the apparatus in a pre-determined way.

As used herein, the term "substantially" in reference to a given parameter, property, or condition means and includes to a degree that one of ordinary skill in the art would understand that the given parameter, property, or condition is met with a degree of variance, such as within acceptable tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

FIG. 1 shows a cross-sectional view of a flow meter 10 according to an embodiment of the present disclosure. The flow meter 10 may include a body 12 defining a fluid channel therein, at least one inlet 14 and at least one outlet 16. The flow meter 10 may include at least one structure, such as an edge tone structure 20, positioned within the cavity and fixed relative to the body 12, the at least one structure shaped and positioned to produce a flow-induced vibration that varies responsive to a rate of fluid flow through the cavity. The flow meter 10 may additionally include a coupler located at each of the inlet 14 and the outlet 16, such as pipe flanges 18, to facilitate the connection of the flow meter 10 to pipes with which the fluid channel of flow meter 10 communicates.

The inlet 14 may comprise a region 22 with a circular cross-section that is lofted into a region 24 with a rectangular shaped cross-section. The cross-section may then converge to a region 26 with a smaller rectangular shaped cross-section, which may remain constant for a distance in the region 26, thus promoting uniform fluid flow. The region 26 may extend to an opening 28 into a chamber 30 located downstream of the region 26.

The edge tone structure 20 may be located within the chamber 30 and aligned with the opening 28. The edge tone structure 20 may comprise a wedge-shaped leading edge (e.g., a knife edge). The edge tone structure 20 extend across the chamber 30, with a first end coupled to a wall and a second end coupled to an opposing wall, and may divide the fluid flow through a portion of the chamber 30 into two separate flow paths around the edge tone structure 20. The outlet 16 may be positioned at an end of the chamber 30, opposite the opening 28 into the chamber 30, and may comprise a circular cross-section.

When fluid is directed into the inlet 14 of the flow meter 10, a fluid jet may be expelled from the opening 28 into the chamber 30. The fluid jet may oscillate around the leading edge of the edge tone structure 20 creating a pure tone or oscillating wave (e.g., sound waves). When the velocity of the fluid jet increases, the frequency of the oscillating wave created by the edge tone structure 20 may also increase. Conversely, when the velocity of the fluid jet decreases, the frequency of the oscillating wave created by the edge tone structure 20 may also decrease. Accordingly, the frequency of the oscillating wave created by the edge tone structure 20 may be correlated to a specific flow velocity, and thus to a specific flow rate for a given fluid through the flow meter 10. The oscillating wave created by the edge tone structure 20 may be measured remotely, as a vibration in a connected structure with a vibration sensor, as will be discussed in further detail below with regard to FIG. 6.

Additionally, the frequency of the oscillating wave created by the edge tone structure 20 for any given fluid jet velocity may be varied by varying the geometry of the flow meter 10. For example, when the distance D between the opening 28 into the chamber 30 and the leading edge of the edge tone structure 20 increases, the frequency of the oscillating wave created by the edge tone structure 20 may decrease. Conversely, when the distance D between the opening 28 into the chamber 30 and the leading edge of the edge tone structure 20 decreases, the frequency of the oscillating wave created by the edge tone structure 20 may increase.

Geometric parameters in addition to the distance D between the opening 28 into the chamber 30 and the leading edge of the edge tone structure 20 may also affect the frequency of the oscillating wave created by the edge tone structure 20. For example, the frequency of the oscillating wave created by the edge tone structure 20 may be varied when one or more of the following geometric parameters are modified: the distance D between the opening 28 into the chamber 30 and the leading edge of the edge tone structure 20; the height of the opening 28; the width W of the opening 28; and the length L of the chamber 30.

Accordingly, a plurality of flow meters may be provided wherein each flow meter of the plurality of flow meters has a geometry different than the other flow meters of the plurality of flow meters, and each of the plurality of flow meters may operate in different frequency ranges.

Figure 2:
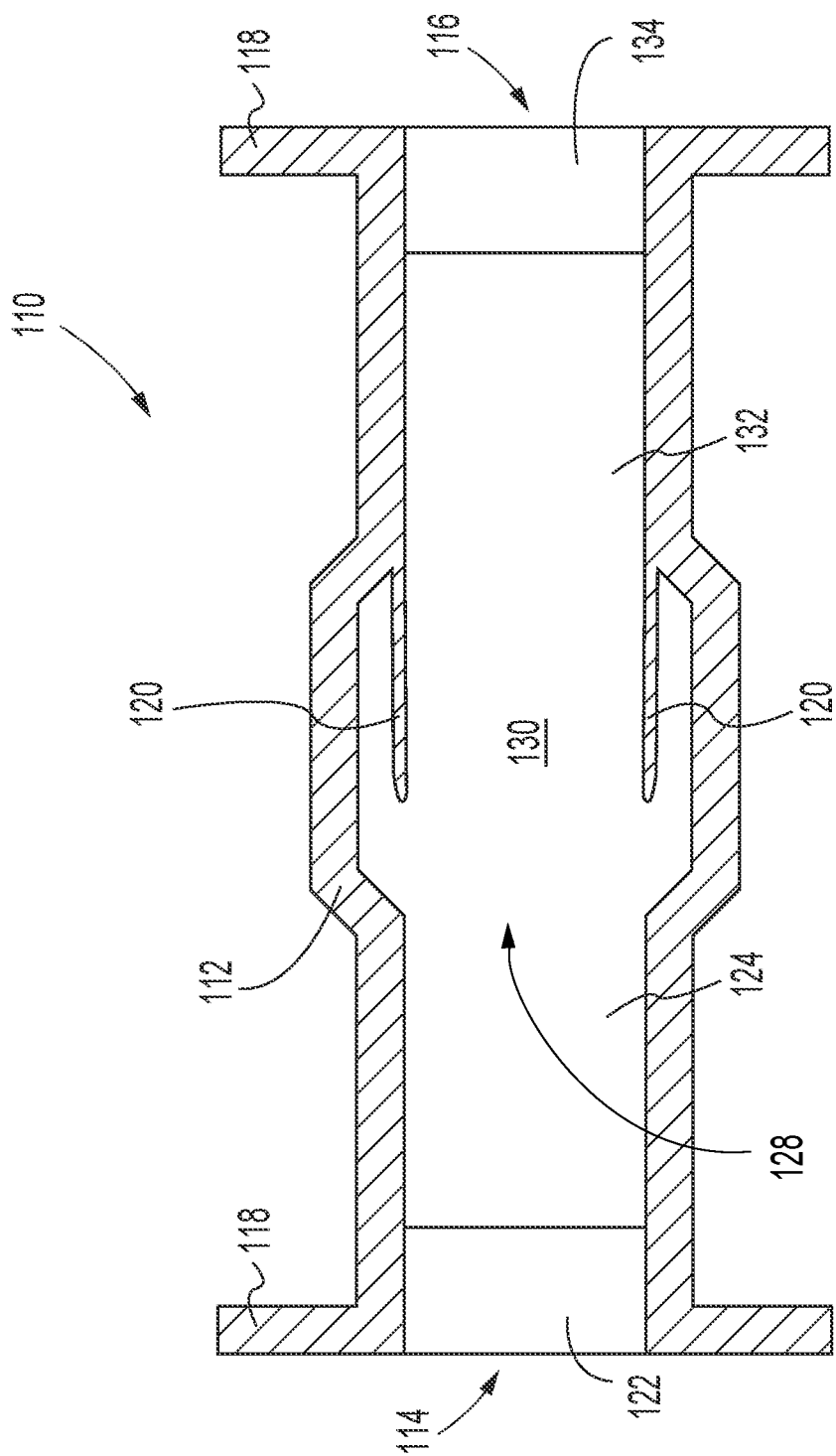
FIG. 2 shows a cross-sectional view of a flow meter comprising reeds according to another embodiment of the present disclosure.

FIG. 2 shows a cross-sectional view of a flow meter 110 according to an additional embodiment of the present disclosure. The flow meter 110 may include a body 112 defining a fluid channel therein, at least one inlet 114 and at least one outlet 116. The flow meter 110 may include at least one structure positioned within the cavity and fixed relative to the body 112, the at least one structure shaped and positioned to produce a flow-induced vibration at a specific natural frequency that varies in intensity (e.g., amplitude) according to a rate of fluid flow through the cavity, such as at least one reed 120. For example, the flow meter 110 may comprise two such structures in the form of two reeds 120. The flow meter 110 may additionally include a coupler located at each of the inlet 114 and the outlet 116, such as pipe flanges 118, to facilitate the connection of the flow meter 110 to pipes.

The inlet 114 may comprise a region 122 with a circular cross-section that is lofted into a region 124 with a rectangular shaped cross-section. The region 124 may extend to a chamber 130 located downstream of the region 124. The chamber 130 may have a rectangular shaped cross-section.

The reeds 120 may be situated along opposing walls within the chamber 130 and a trailing end of each reed 120 may be attached to a wall of the chamber such that the reeds 120 are cantilevered. The reeds 120 may each comprise an airfoil-shaped leading edge, as shown in enlarged detail view in FIG. 3. The outlet 116 may be positioned at an end of the chamber 130, opposite the opening 128 into the chamber 130, and may comprise a region 132 comprising a rectangular cross-section that is lofted into a region 134 with a circular cross-section.

When fluid is directed into the inlet 114 of the flow meter 110, the fluid may be directed into the chamber 130 and may flow over the reeds 120. The reeds 120 may vibrate at a selected natural frequency, which may be determined by the geometry of the reeds 120, which may generate a specific tone or oscillating wave (e.g., sound waves). When the velocity of the fluid increases, the amplitude (e.g., volume) of the oscillating wave created by the reeds 120 at the selected natural frequency may also increase. Conversely, when the velocity of the fluid decreases, the amplitude of the oscillating wave created by the reeds 120 may also decrease. Accordingly, the amplitude of the oscillating wave created by the reeds 120 may be correlated to a specific flow velocity, and thus to a specific flow rate for a given fluid through the flow meter 110. The oscillating wave created by the reeds 120 may be measured remotely, as a vibration in a connected structure with a vibration sensor, as will be discussed in further detail below with regard to FIG. 6.

Figure 3:
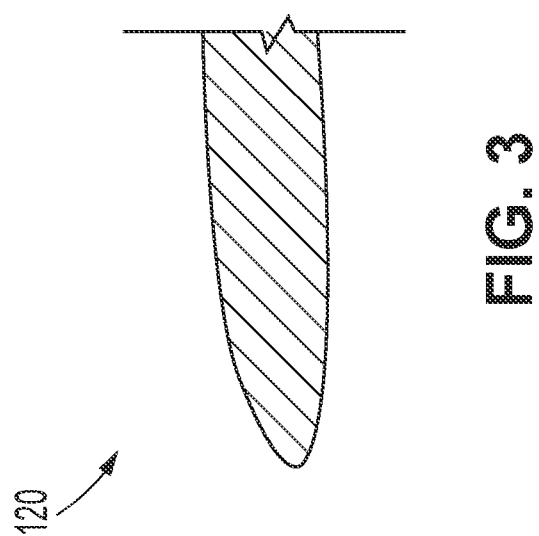
FIG. 3 shows a cross-sectional detail view of a reed of the flow meter of FIG. 2.
Figure 4:
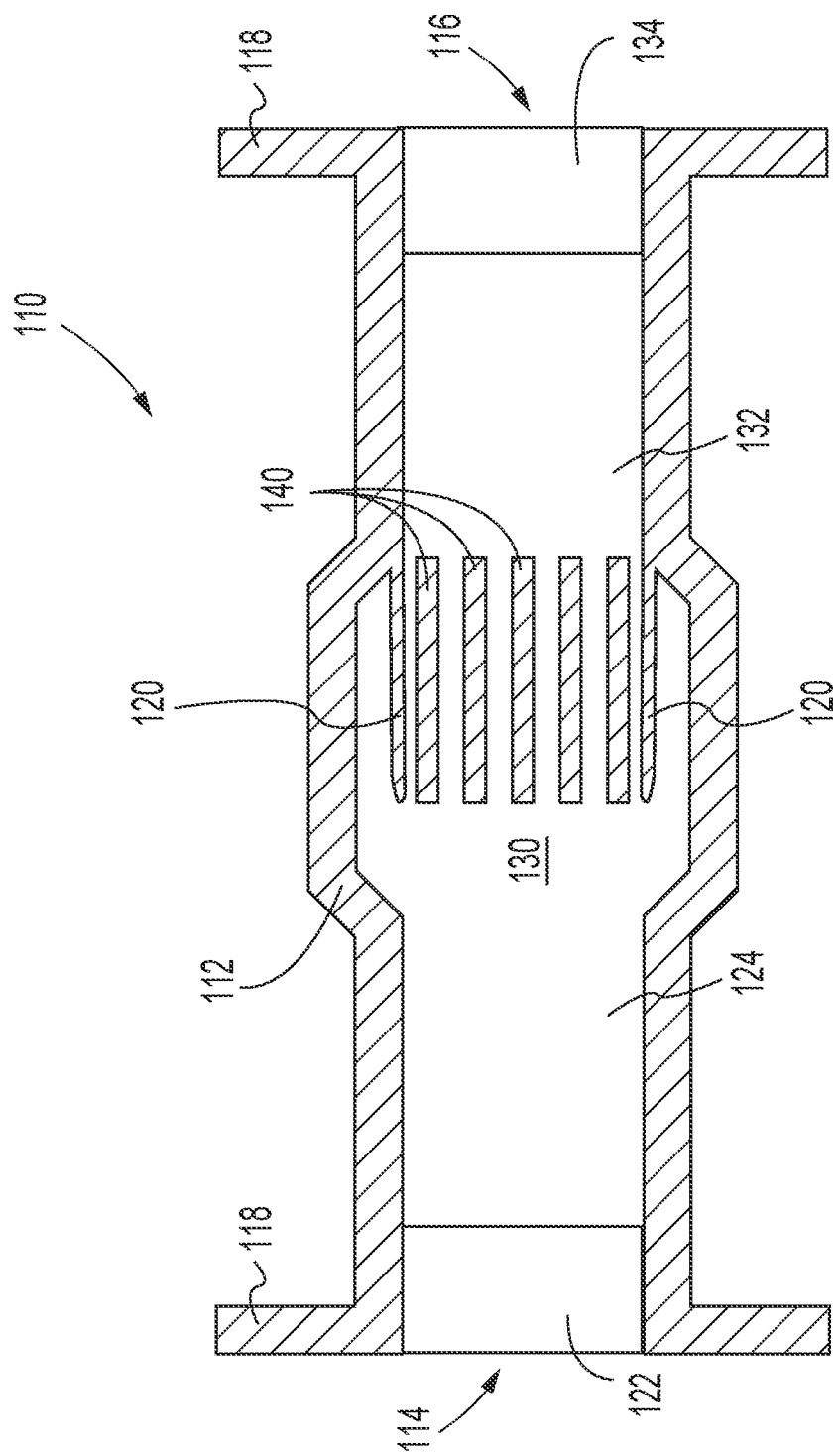
FIG. 4 shows a cross-sectional view of the flow meter of FIG. 2 further comprising a flow obstruction feature.

In some embodiments, such as shown in FIG. 4, which is another implementation of the flow meter 110 of FIGS. 2 and 3, flow volume restricting features 140 may be included in chamber 130, which may extend across the chamber 130, dividing the chamber into channels, to increase the flow velocity over the reeds 120, thus increasing the intensity (e.g., the amplitude, the volume) of the oscillating wave generated by the reeds 120.

Additionally, the natural frequency of the oscillating wave created by the reeds 120 for any given fluid jet velocity may be varied by varying the geometry of the reeds 120.

Accordingly, a plurality of flow meters may be provided wherein each flow meter of the plurality of flow meters has a geometry different than the other flow meters of the plurality of flow meters, and each of the plurality of flow meters may operate in different frequencies and/or may operate at different amplitudes.

Figure 5:
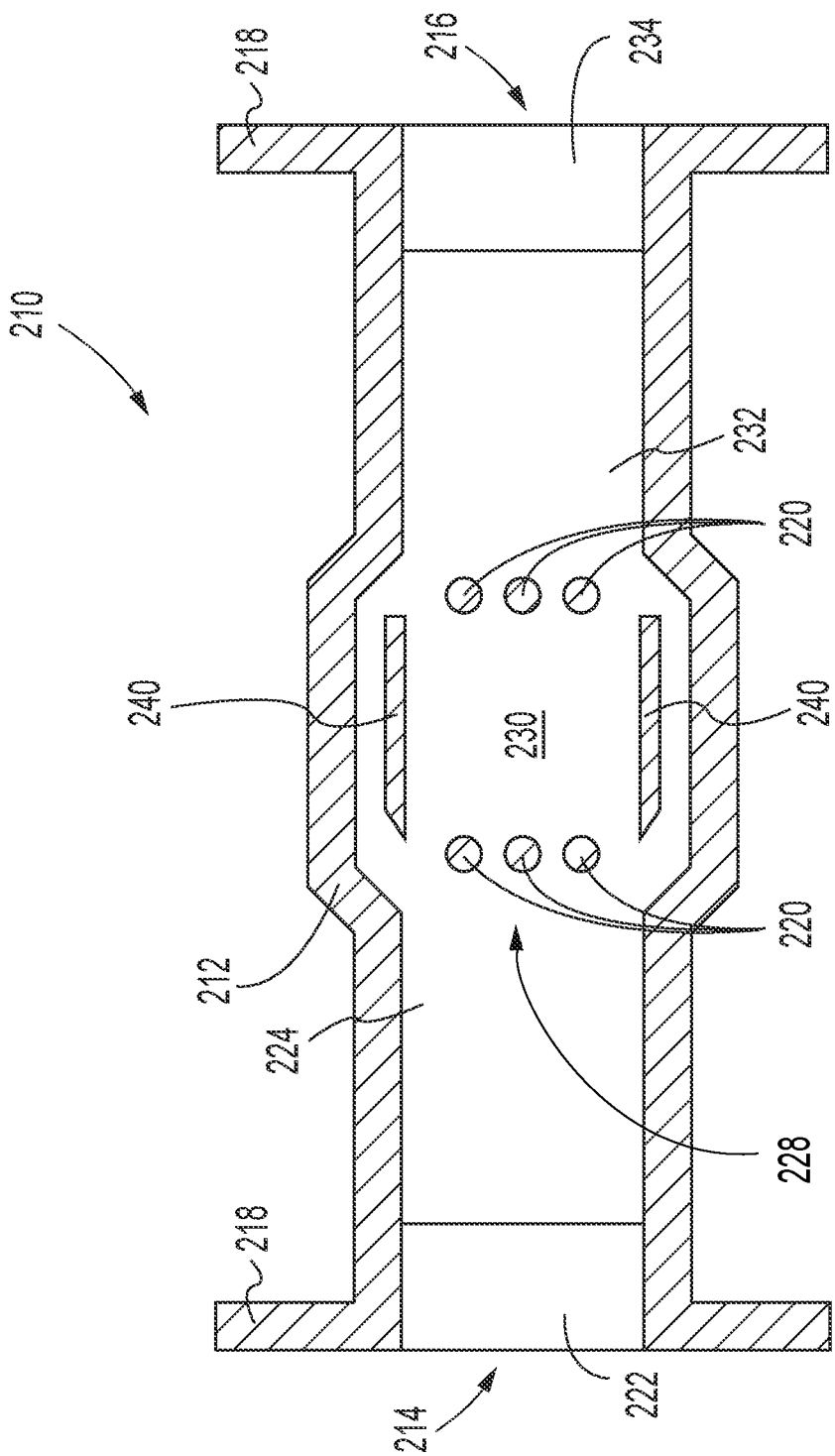
FIG. 5 shows a cross-sectional view of a flow meter comprising vortex shedding structures according to another embodiment of the present disclosure.

FIG. 5 shows a cross-sectional view of a flow meter 210 according to an additional embodiment of the present disclosure. The flow meter 210 may include a body 212 defining a fluid channel therein, at least one inlet 214 and at least one outlet 216. The flow meter 210 may include at least one structure, such as at least one vortex shedding structure, positioned within the cavity and fixed relative to the body 212, the at least one structure shaped and positioned to produce a flow-induced vibration that may vary in intensity (e.g., amplitude) according to a rate of fluid flow through the cavity. For example, the flow meter 210 may include a plurality of cylindrical pins 220 as vortex shedding structures, the cylindrical pins 220 extending across chamber 230 and positioned transverse to a direction of fluid flow. The flow meter 210 may additionally include a coupler located at each of the inlet 214 and the outlet 216, such as pipe flanges 218, to facilitate the connection of the flow meter 210 to pipes.

The inlet 214 may comprise a region 222 with a circular cross-section that is lofted into a region 224 with a rectangular shaped cross-section. The region 224 may extend to a chamber 230 located downstream of the region 224. The cylindrical pins 220 may extend between opposing walls of the chamber 230 and may be spaced in one or more arrays, such as two arrays of mutually parallel cylindrical pins 220. The outlet 216 may be positioned at an end of the chamber 230, opposite the opening 228 into the chamber 230, and may comprise a region 232 comprising a rectangular cross-section that is lofted into a region 234 with a circular cross-section.

When fluid is directed into the inlet 214 of the flow meter 210, the fluid may be directed into the chamber 230 and may flow over the cylindrical pins 220. Vortices may be formed in the fluid as the fluid flows over the cylindrical pins 220. The vortices may be shed from the cylindrical pins 220 in an alternating pattern (e.g., clock-wise rotational direction, then counter-clockwise rotation, and so on) and may vibrate at a selected natural frequency, similar to the whistling of power lines in the wind. Additionally, the vortices shed by a cylindrical pin 220 may interact with vortices shed by another cylindrical pin 220, which may result in an oscillating wave having a pattern of increased and decreased amplitude (e.g., a ringing tone, like a flute). The oscillating wave created by the cylindrical pins 220 may be measured remotely, as a vibration in a connected structure with a vibration sensor, as will be discussed in further detail below with regard to FIG. 6.

Optionally, the flow meter 210 may additionally include one or more edge tone structures 240.

When the velocity of the fluid increases, the amplitude (e.g., volume) of the oscillating wave created by the cylindrical pins 220 may also increase. Conversely, when the velocity of the fluid decreases, the amplitude of the oscillating wave created by the cylindrical pins 220 may also decrease. Accordingly, the amplitude of the oscillating wave created by the cylindrical pins 220 may be correlated to a specific flow velocity, and thus to a specific flow rate through the flow meter 210.

Geometric features may be altered, such as the size of the cylindrical pins 220, and/or the spacing of the cylindrical pins 220, to alter the tone of the flow meter 210 (e.g., alter the frequency, and/or alter the variation in amplitude (ringing)).

The flow meters 10, 110, 210 may be manufactured of a material that may be resistant to chemicals and high temperatures, such as stainless steel. The flow meters 10, 110, 210 may be manufactured using an additive manufacturing process with a powder bed system, such as selective laser melting (SLM), direct metal laser sintering (DMLS), and/or electron beam melting (EBM). The flow meters 10, 110, 210 may also be manufactured with other conventional techniques such as by milling, or casting.

Figure 6:
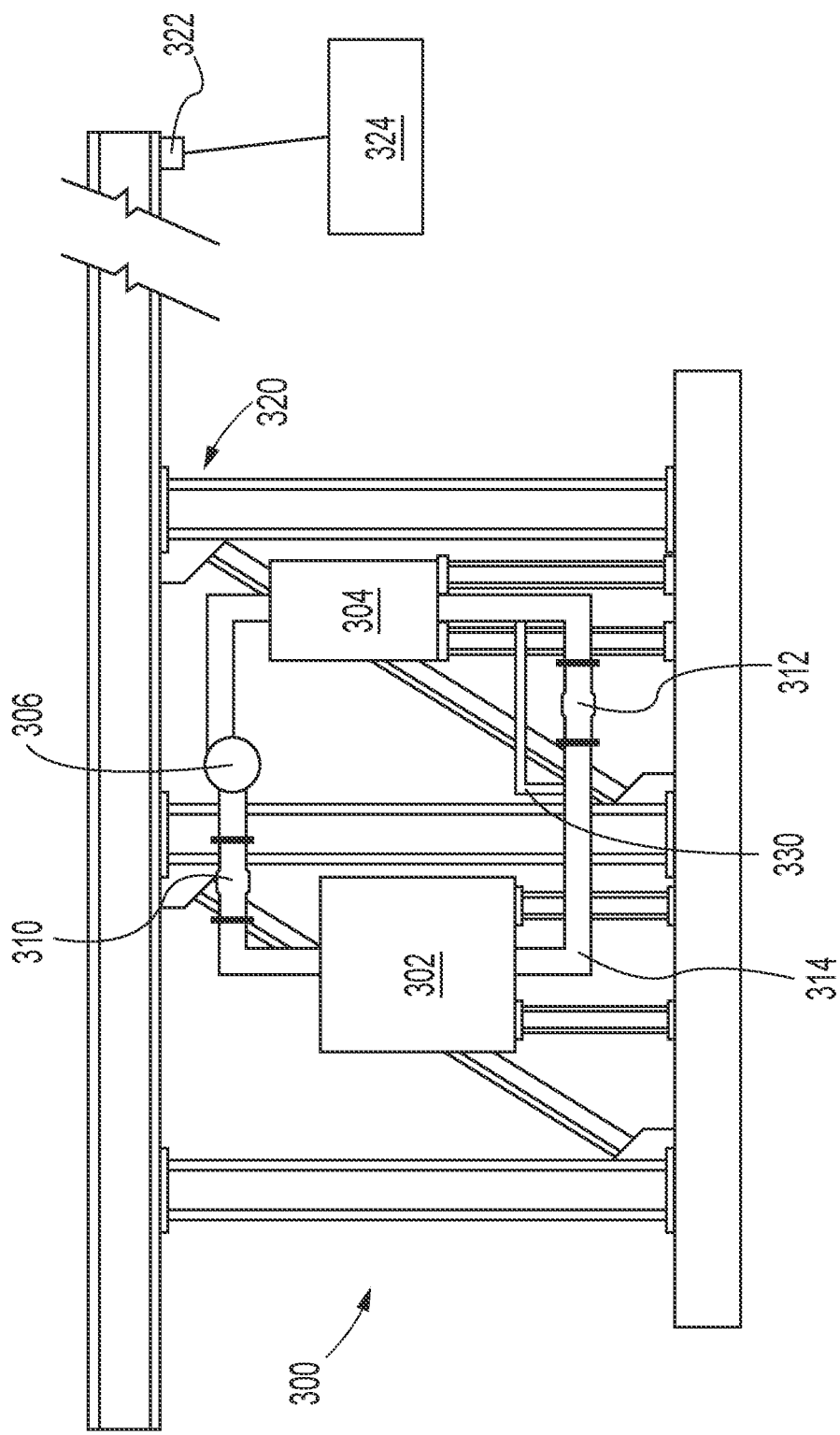
FIG. 6 shows a system comprising flow meters according to embodiments of the present disclosure.

FIG. 6 shows a nuclear reactor system 300 including a flow metering system according to embodiments of the present disclosure. The nuclear reactor system 300 may include a nuclear reactor 302, such as a molten salt reactor, a heat exchanger 304, a pump 306, a plurality of flow meters 310, 312, which may be configured such as one or more of the flow meter 10 of FIG. 1, the flow meters 110 of FIGS. 2-4, and the flow meter 210 of FIG. 5, coupled together with piping 314. Accordingly, a working fluid of the nuclear reactor may be directed through a closed system comprising the nuclear reactor 302, the heat exchanger 304, the pump 306, and the plurality of flow meters 310, 312. The nuclear reactor system 300 may be coupled to a support structure 320, such as a steel structural support for a building enclosing the nuclear reactor 302. Accordingly, the flow meters 310, 312 may be coupled, either directly or via other components of the nuclear reactor system 300, to the support structure 320.

The environment near the nuclear reactor 302 may be an extreme thermal and radiation environment, due to a nuclear reaction in a core of the nuclear reactor 302. Components that are sensitive to heat and radiation, such as electronic components, may require special shielding, active cooling, or other considerations to survive this environment. Accordingly, it may be relatively expensive and/or impractical to provide electronic components in the area near the nuclear reactor 302.

At least one vibration sensor 322 (e.g., acoustic sensor), such as one or more piezoelectric sensor, may be coupled to the support structure 320 at a location that is remote from the nuclear reactor 302 and the flow meters 310, 312, and thus away from the extreme thermal and radiation environment near the nuclear reactor 302. A signal processor 324 may also be located at the remote location and may be configured to receive a signal from the at least one vibration sensor 322 and determine at least one flow rate associated with the flow meters 310, 312.

As the support structure 320 is coupled to the flow meters 310, 312 flow-induced vibrations (e.g., acoustic signals) generated by the flow meters 310, 312 may travel through the support structure 320 and may be detected by the at least one vibration sensor 322. Additionally, each of the plurality of flow meters 310, 312 may have a geometry different than the other flow meters 310, 312 of the plurality of flow meters 310, 312 and generate distinct and distinguishable flow-induced vibrations.

Optionally, the geometry of the flow meters 310, 312 may not be different, and the system may be configured such that the flow meters 310, 312 operate to produce distinct and distinguishable flow-induced vibrations, such as vibrations of differing amplitudes. For example, a bypass channel 330 may be positioned and configured to direct a portion of the working fluid around the flow meter 312, so that only a fraction of the working fluid is directed through the flow meter 312, thus resulting the in the flow meter 312 experiencing a decreased flowrate therethrough and producing flow-induced vibrations of a lower amplitude relative to the flow meter 310.

In operation, the working fluid may be directed through a channel and over a structure (e.g., the edge tone structure 20 (FIG. 1), the reeds 120 (FIG. 3), the cylindrical pins 220 (FIG. 5)) of the flow meter 310 to produce a first flow-induced vibration that varies according to the rate of fluid flow through the flow meter 310. The at least one vibration sensor 322 may measure the vibration of the support structure 320 at the remote location and the signal processor 324 may determine the rate of fluid flow through the flow meter 310 from the measured vibration. The working fluid may also be directed through a channel and over a structure (e.g., the edge tone structure 20 (FIG. 1), the reeds 120 (FIG. 3), the cylindrical pins 220 (FIG. 5)) of the flow meter 312 to produce a second flow-induced vibration that varies according to the rate of fluid flow through the flow meter 312. The at least one vibration sensor 322 may measure the vibration of the support structure 320 at the remote location and the signal processor 324 may determine the rate of fluid flow through the flow meter 312 from the measured vibration.

The measured vibration of the support structure may be converted into an electrical signal and the electrical signal may be separated into a first signal corresponding to the flow-induced vibration from the flow meter 310 and a separate second signal corresponding to the flow-induced vibration from the flow meter 312. For example, the first signal may be identified by identifying a signal having a first frequency and the second signal may be identified by identifying a signal having a different second frequency. For another example, the first signal may be identified by identifying a signal having a first amplitude and the second signal may be identified by identifying a signal having a different second amplitude.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A flow meter comprising:
   a body defining a fluid channel, the body comprising an elongated portion defining an opening, the elongated portion extending into the fluid channel and configured to direct a fluid flow within the fluid channel;
   at least one structure positioned within the fluid channel and fixed relative to the body, the at least one structure shaped and positioned to produce a flow-induced vibration that varies according to a rate of fluid flow through the fluid channel, wherein the flow-induced vibration is transmitted through the body;
   a support structure adjacent to the body and configured to receive the flow-induced vibration of the at least one structure; and
   at least one vibration sensor coupled to the support structure at a location remote from the body and configured to sense the flow-induced vibration in the support structure.

2. The flow meter of claim 1, wherein the at least one structure is further shaped and positioned to vibrate at varying frequencies in response to a varying fluid flow rate.

3. The flow meter of claim 2, wherein the at least one structure comprises an edge tone structure.

4. The flow meter of claim 1, wherein the at least one structure is further shaped and positioned to vibrate at a specific natural frequency in response to a fluid flow.

5. The flow meter of claim 4, wherein the at least one structure comprises a reed.

6. The flow meter of claim 5, wherein a leading edge of the reed is shaped generally as an airfoil.

7. The flow meter of claim 1, wherein the at least one structure comprises at least one vortex shedding structure.

8. The flow meter of claim 7, wherein the at least one vortex shedding structure comprises a plurality of cylindrical pins oriented transverse to a direction of the fluid channel.

9. The flow meter of claim 1, wherein the elongated portion is positioned to direct the fluid flow to the at least one structure.

10. A method of measuring a fluid flow rate, the method comprising:
    directing a fluid over a first structure positioned within a first channel defined by a flow meter, the first structure spanning the flow meter such that the fluid flows over a first and a second side of the first structure;
    producing a first flow-induced vibration that varies according to a rate of fluid flow in a first channel with the first structure;
    measuring the first flow-induced vibration of a remote structure coupled to the first channel;
    determining the rate of fluid flow in the first channel from the measured first flow-induced vibration;

directing a fluid over a second structure positioned within a second channel defined by the flow meter, the second structure spanning the flow meter such that the fluid flows over a first and second side of the second structure;

producing a second flow-induced vibration that varies according to a rate of fluid flow in the second channel with the second structure;

determining the rate of fluid flow in the second channel from the measured first flow-induced vibration;

converting the measured second flow-induced vibration to an electrical signal; and separating the electrical signal to a first signal corresponding to the first flow-induced vibration and a separate second signal corresponding to the second flow-induced vibration.

11. The method of claim 10, wherein separating the electrical signal comprises identifying the first signal having a first frequency and identifying the second signal having a different second frequency.

12. The method of claim 10, wherein separating the electrical signal comprises identifying the first signal having a first amplitude and identifying the second signal having a different second amplitude.

13. The method of claim 10, further comprising directing a first portion of a fluid flow through the first channel and directing a second portion of the fluid flow through a bypass channel.

14. A flow metering system comprising:
  at least one flow meter comprising:
    a body defining a fluid channel therein; and
    at least one structure positioned within the fluid channel and fixed relative to the body, the at least one structure shaped and positioned to produce a flow-induced vibration that varies according to a rate of fluid flow through the fluid channel, wherein the at least one structure comprises at least one vortex shedding structure, the at least one vortex shedding structure comprising a plurality of cylindrical pins oriented transverse to a direction of the fluid channel;
  a structure coupled to the at least one flow meter;
  at least one vibration sensor coupled to the structure at a location remote from the at least one flow meter; and
  a signal processor configured to receive a signal from the at least one vibration sensor and determine at least one flow rate.

15. The flow metering system of claim 14, wherein the at least one flow meter comprises a plurality of flow meters, each flow meter of the plurality of flow meters having a geometry different than the other flow meters of the plurality of flow meters.

16. The flow metering system of claim 14, wherein the at least one structure of the least one flow meter comprises an edge tone structure.

17. The flow metering system of claim 14, wherein the at least one flow meter is positioned within an extreme thermal and radiation environment, and wherein the at least one vibration sensor and processor are located remote from the extreme thermal and radiation environment.

18. The flow metering system of claim 14, wherein the at least one flow meter is coupled to a nuclear reactor and configured to receive a working fluid of the nuclear reactor.

19. The flow metering system of claim 14, wherein the at least one vibration sensor comprises a piezoelectric sensor.

* * * * *